(12) United States Patent
Wilson

(10) Patent No.: US 11,104,193 B2
(45) Date of Patent: *Aug. 31, 2021

(54) COMBINATION TANDEM PULLER

(71) Applicant: Johnnie L. Wilson, Detroit, MI (US)

(72) Inventor: Johnnie L. Wilson, Detroit, MI (US)

(*) Notice: Subject to any disclaimer, the term of this patent is extended or adjusted under 35 U.S.C. 154(b) by 220 days.

This patent is subject to a terminal disclaimer.

(21) Appl. No.: 16/088,209

(22) PCT Filed: Jan. 30, 2017

(86) PCT No.: PCT/US2017/015573
§ 371 (c)(1),
(2) Date: Sep. 25, 2018

(87) PCT Pub. No.: WO2017/132651
PCT Pub. Date: Aug. 3, 2017

(65) Prior Publication Data
US 2019/0232742 A1    Aug. 1, 2019

Related U.S. Application Data

(63) Continuation of application No. 15/217,205, filed on Jul. 22, 2016, now Pat. No. 9,844,989.

(60) Provisional application No. 62/288,160, filed on Jan. 28, 2016.

(51) Int. Cl.
*B60D 1/58* (2006.01)
*B60D 1/01* (2006.01)
*B60D 1/26* (2006.01)
*B62D 53/08* (2006.01)

(52) U.S. Cl.
CPC ............ *B60D 1/58* (2013.01); *B60D 1/015* (2013.01); *B60D 1/26* (2013.01); *B62D 53/08* (2013.01)

(58) Field of Classification Search
CPC . B60D 1/58; B60D 1/015; B60D 1/26; B62D 53/08
See application file for complete search history.

(56) References Cited

U.S. PATENT DOCUMENTS

| 543,290 | A | * | 7/1895 | Cardwell | F16G 11/12 |
|---|---|---|---|---|---|
|  |  |  |  |  | 140/123.5 |
| 3,644,951 | A |  | 2/1972 | Colburn |  |
| D254,704 | S | * | 4/1980 | Hammond | D8/14 |
| 4,531,274 | A |  | 7/1985 | Sanders |  |
| D311,482 | S | * | 10/1990 | Morton | D8/14 |
| 5,201,559 | A |  | 4/1993 | Boring et al. |  |

(Continued)

OTHER PUBLICATIONS

Notification of Transmittal of the International Search Report and The Written Opinion of the International Searching Authority, or the Declaration (dated Apr. 21, 2017) for PCT Appn. No. PCT/17/015,573, filed Jan. 30, 17, 13 pgs.

(Continued)

*Primary Examiner* — Tony H Winner
*Assistant Examiner* — Marlon A Arce
(74) *Attorney, Agent, or Firm* — Brooks Kushman P.C.

(57) ABSTRACT

A combination tandem puller for releasing a trailer from a tractor in a tractor trailer includes a shaft section having a first end and a second end, a handle attached to the first end of the shaft section, a hook section attached to the second end of the shaft section, and a forked tab attached to and extending from the shaft section.

19 Claims, 7 Drawing Sheets

(56) References Cited

U.S. PATENT DOCUMENTS

| | | | |
|---|---|---|---|
| 5,344,201 A * | 9/1994 | Offin | B25F 1/00 |
| | | | 294/175 |
| 5,423,567 A | 6/1995 | Upton | |
| 5,678,834 A | 10/1997 | Wise | |
| 6,116,747 A | 9/2000 | Grawemeyer et al. | |
| 6,279,932 B1 | 8/2001 | White et al. | |
| 6,375,162 B1 | 4/2002 | Johnson | |
| 7,159,260 B2 | 1/2007 | Hansen | |
| 7,325,822 B1 | 2/2008 | Humphreys et al. | |
| D566,495 S | 4/2008 | Hackmann | |
| 7,621,551 B1 | 11/2009 | Scott | |
| 7,762,529 B1 * | 7/2010 | Scott | B60D 1/06 |
| | | | 254/120 |
| 8,210,584 B2 | 7/2012 | Hiltz | |
| 9,095,969 B1 * | 8/2015 | Oswald | B25F 1/00 |
| 9,844,989 B2 * | 12/2017 | Wilson | B62D 53/08 |
| 2002/0048167 A1 * | 4/2002 | Birdwell | F21V 21/145 |
| | | | 362/191 |
| 2007/0187923 A1 | 8/2007 | McNeal et al. | |
| 2011/0309646 A1 | 12/2011 | Wells | |
| 2014/0173830 A1 | 6/2014 | Arthur | |
| 2015/0015012 A1 | 1/2015 | Coleman | |
| 2017/0043468 A1 | 2/2017 | Wade | |

OTHER PUBLICATIONS http://www.trucksafetystore.com/pullers.html, copyright 2015, 1 pg.
https://sta-rat.com/pages/how-it-works, copyright 2001-2017, 4 pgs.
Non-final Office Action dated Mar. 15, 2017 for U.S. Appl. No. 15/217,205, filed Jul. 22, 2016, 5 pgs.

\* cited by examiner

COMBINATION TANDEM PULLER

CROSS-REFERENCE TO RELATED APPLICATIONS

This application is the U.S. national phase of PCT Appln. No. PCT/US2017/015573 filed Jan. 30, 2017 which claims priority to U.S. patent application Ser. No. 15/217,205 filed Jul. 22, 2016, now U.S. Pat. No. 9,844,989 issued Dec. 19, 2017, which claims the benefit of U.S. provisional application Ser. No. 62/288,160 filed Jan. 28, 2016, the disclosures of which are hereby incorporated in their entirety by reference herein.

TECHNICAL FIELD

In at least one aspect, the present invention relates generally to a tool for manipulating the tandem controls of a tractor trailer.

BACKGROUND

Over the last century, there have been significant advances in transportation. Trains, planes and boats enable companies to quickly ship large cargo all over the world. Despite these various advanced shipping methods, the tractor trailer remains the only reliable means of cargo delivery between massive depots and warehouses, and local businesses. Since tractor trailers are able to travel on the surface streets, they are able to cover the last leg of the journey for cargo. As such, truck drivers have to comply with the various regulations required to transport cargo between states.

One such regulation is the distribution of weight within a trailer. To accommodate for these regulations, trucks are equipped with tandem slider systems which shift the weight within a trailer. These tandem systems reposition the trailer so that the weight of the cargo rests on the different wheel axles of the tractor trailer. While these tandem systems are useful, they often require a truck driver to crawl beneath his vehicle to manually release locking pins. The action of crawling beneath a trailer often results in driver injury.

Accordingly, there is a need for improved method and equipment for manipulating the release locking pins in tractor trailers.

SUMMARY

The present invention solves one or more problems of the prior art by providing, in at least one embodiment, a combination tandem puller, slider, and scope ("combination puller") for releasing a trailer from the tractor in a tractor trailer or sliding the tandem is provided. The combination tandem puller includes a shaft section having a first end and a second end, a handle attached to the first end of the shaft section, a hook section attached to the second end of the shaft section, and a forked tab attached to and extending from the shaft section.

In another embodiment, a tandem puller for releasing a trailer from a tractor in a tractor trailer is provided. The combination tandem puller includes a shaft section having a first end and a second end, a handle attached to the first end of the shaft section, and a forked tab attached to and extending from the shaft section. Characteristically, the forked tab is closer to the second end than the first end.

Advantageously, the combination tandem puller addresses the problems related to releasing the tandem locking pins by giving drivers a tool which removes the need for crawling under a trailer. With the provided extended reach, a tractor trailer driver can actuate the tandem release button or pull the tandem bar handle without crawling underneath the trailer. Variations that include an integrated flashlight can illuminate the area beneath the trailer providing the driver with improved viewing of the tandem release button or the tandem bar handle.

DETAILED DESCRIPTION

Figure 1:
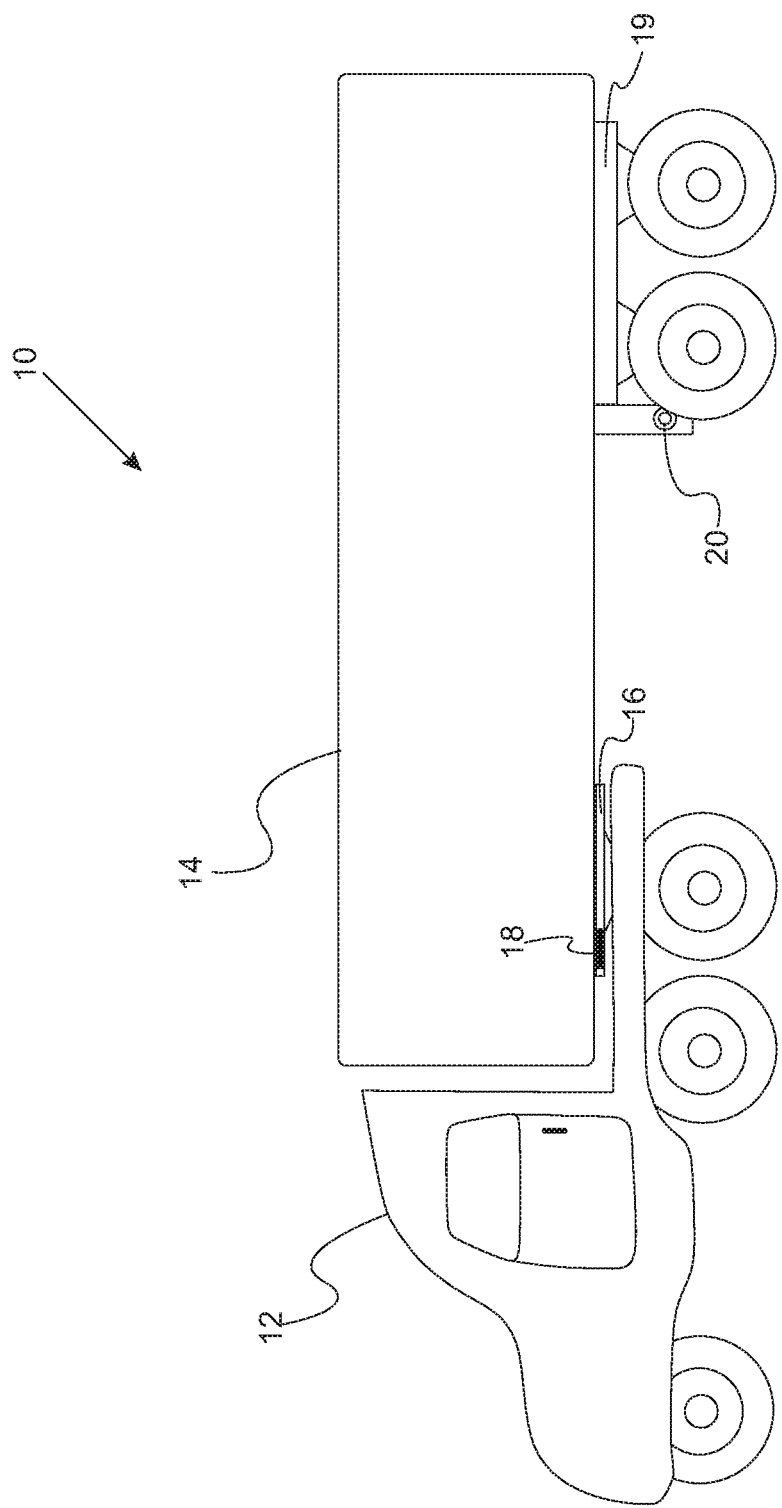
FIG. 1 is a side view of a tractor trailer having a fifth wheel that can be actuated by various embodiments of the tandem pullers set forth herein.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Figure 2:
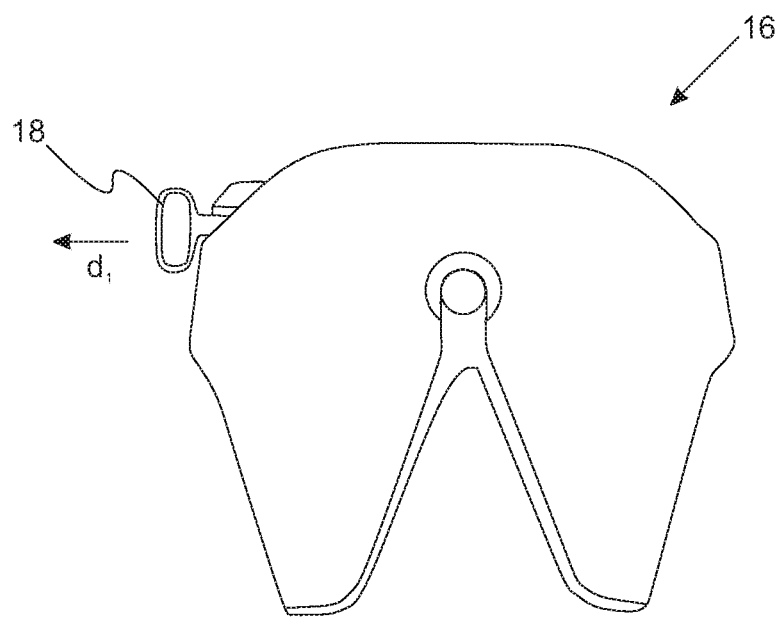
FIG. 2 provides a top view of a fifth wheel having a release bar.
Figure 3:
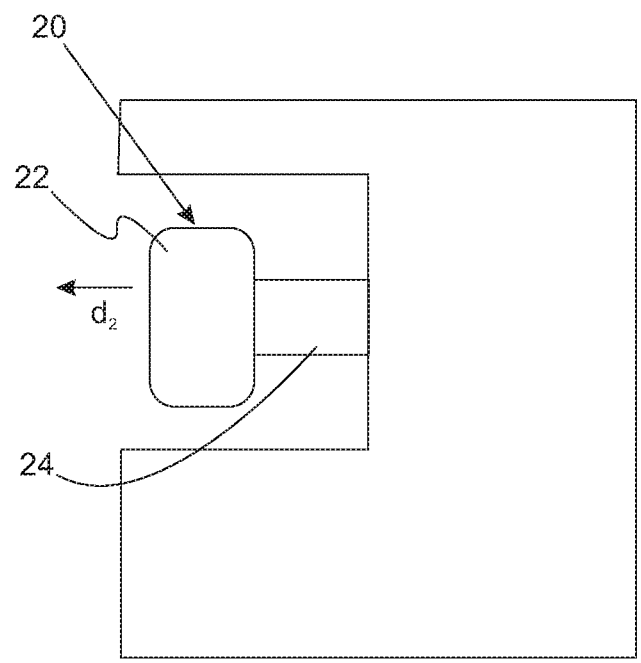
FIG. 3 provides a side view of a release button that can be actuated by various embodiments of the tandem pullers set forth herein.

With reference to FIG. 1, a schematic side view of a tractor trailer is provided. Tractor trailer 10 includes tractor 12 and trailer 14. Trailer 14 is releasably connected to tractor 12 by a conventional fifth wheel 16. In one variation, fifth wheel 16 includes release bar 18 for releasing trailer 14 from tractor 12. In another variation, sliding of tandem 19 is initiated by actuation of release button 20. Typically, release button 20 is an air actuated release button. As depicted in FIG. 2, fifth wheel 16 includes release bar 18 which is pulled along direction $d_1$ to release trailer 14 from tractor 12. Similarly, as depicted in FIG. 3, release button 20 can be pulled along direction $d_2$ to slide tandem 19 in order to distribute weight of trailer 14. In this regard, release button 20 includes button head 22 and button neck 24. In many situations, it is necessary for a user to lean or crawl under trailer 14 in order to operate the release bar 18 or release button 20. Advantageously, embodiments of the present invention avoid this danger by allowing a user to operate release bar 18 or release button 20 from a distance.

Figure 4:
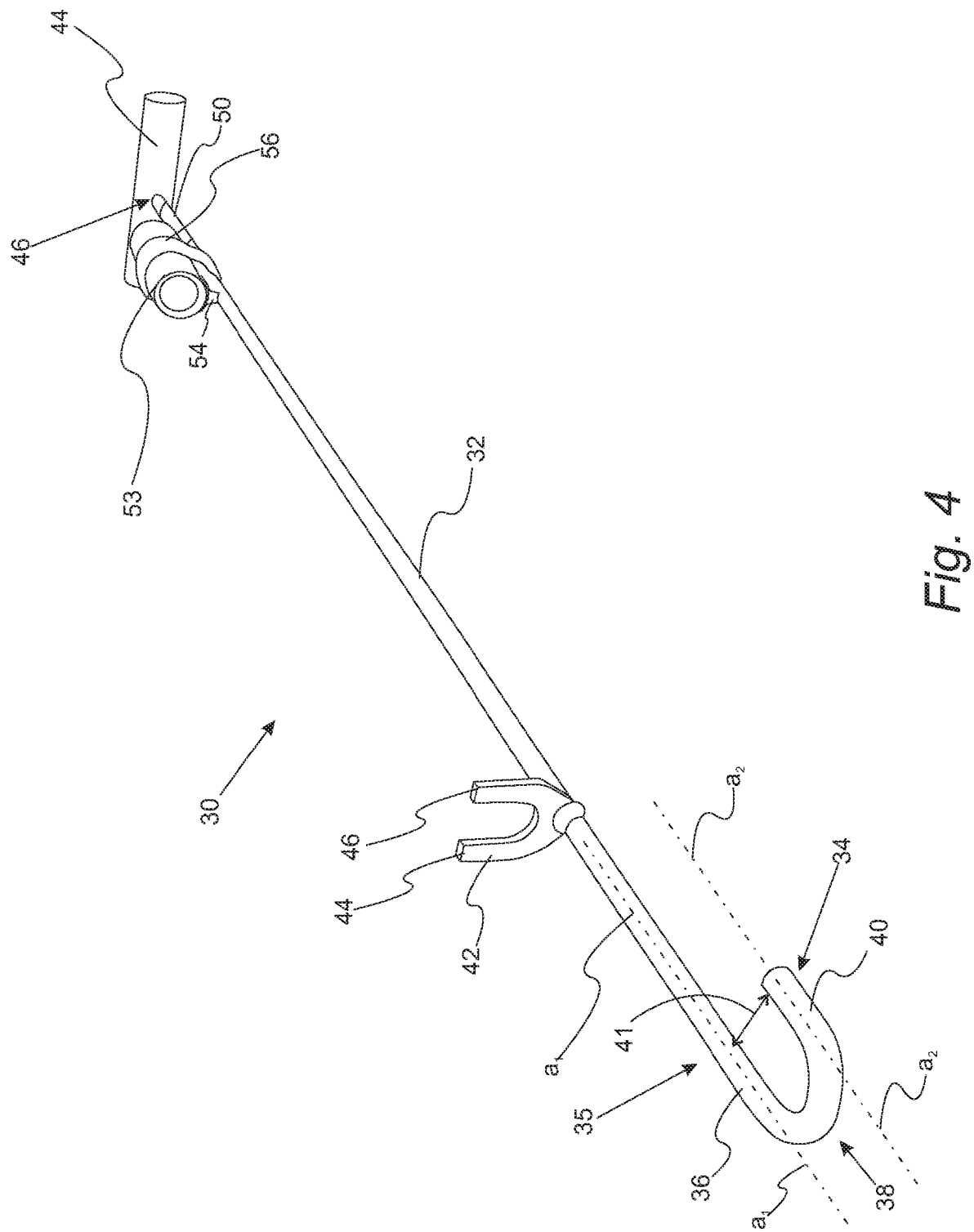
FIG. 4 is a perspective view of a combination tandem puller having an attached flashlight.
Figure 5:
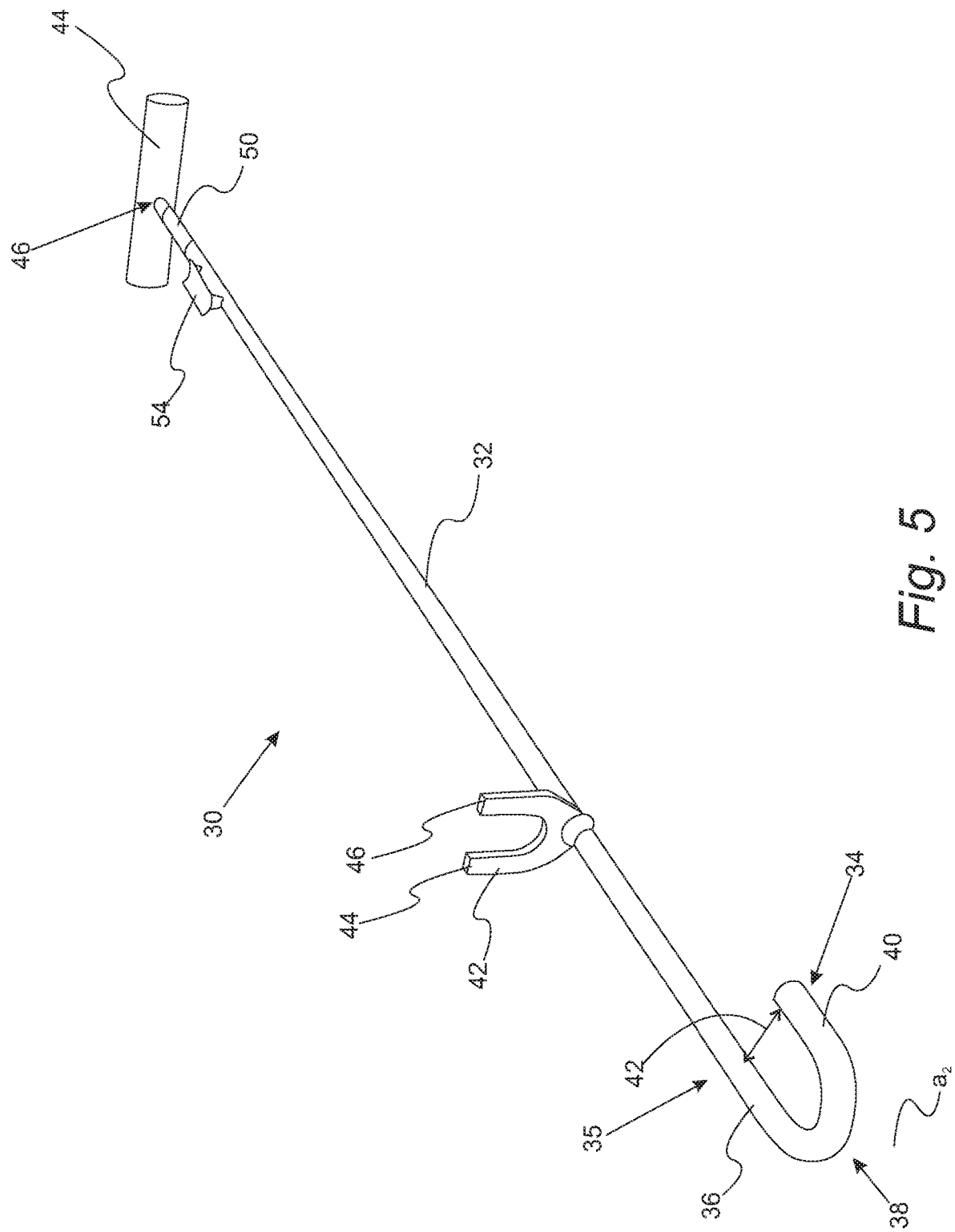
FIG. 5 is a perspective view of a combination tandem puller with the flashlight removed.
Figure 6:
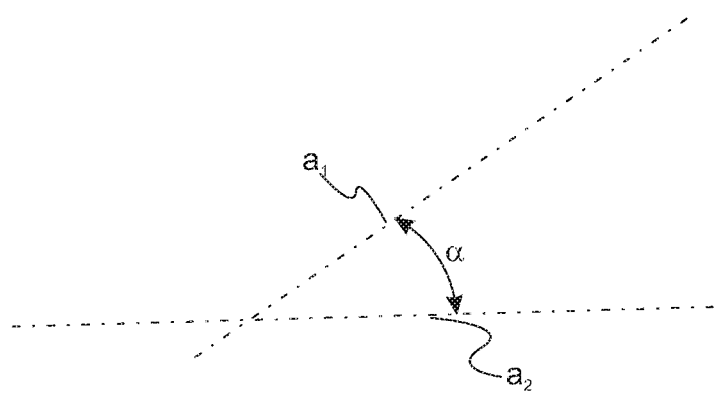
FIG. 6 provides an illustration of the orientation angle between the front section and shank section of a J-hook used in the combination tandem puller.

With reference to FIGS. 4, 5, and 6, schematic illustrations of a combination tandem puller are provided. Combination tandem puller 30 includes shaft section 32 attached to hook section 34 at shaft section end 35. Shaft section 32 is typically a rod, and in particular, a metal rod. Hook section 34 includes a shank section 36, bend 38, and front section 40. In particular, hook section 34 is a J-hook (i.e., having the shape of the letter J). Gape 41 is the shortest distance between hook end 40 and shank section 36. In a refinement, gape 41 is from about 0.25 inches to about 5 inches. In another refinement, gape 41 is from about 0.5 inches to about 2 inches. Axis $a_1$ is an imaginary line through the center of shank section 36 while axis $a_2$ is an imaginary line through the center of front section 40. In a refinement as depicted in FIG. 6, the angle α between axis $a_1$ and $a_2$ is from −30 degrees to 90 degrees. In another refinement, the angle α between axis $a_1$ and $a_2$ is from 0 degrees (i.e., parallel) to 90 degrees.

Forked tab 42 extends from shaft section 32. Forked tab 42 is a two pronged fork structure generally defining a U-shape. Forked tab 42 includes prongs 44, 46 which assist in the actuation of a release button. Tab 42 is oriented so that hook section 34 does not interfere with its use. In one refinement, forked tab 42 is perpendicular to hook section 34.

Still referring to FIGS. 4, 5, and 6, in one variation, combination tandem puller 30 includes handle 44 which is attached to end 46 of shaft section 32. Alternatively, in another variation, gripping section 50 is positioned over shaft section 32. In another variation, flashlight 52 is attached to shaft section 32 in order to provide a user with the ability to illuminate under a trailer when using combination tandem puller 30. In a refinement, flashlight 52 is held on holder 54 via strap 56.

With reference to FIGS. 1-6, in situations where trailer 10 utilizes a release bar for separation of the trailer, a user engages release bar 18 (i.e., hooks onto) and pulls the release bar along direction $d_1$. Similarly, in situations where trailer 10 utilizes a release button for sliding tandem 19, a user engages release button 20 by positioning prongs 44, 46 behind button head 22 and pulling along direction $d_2$.

Figure 7:
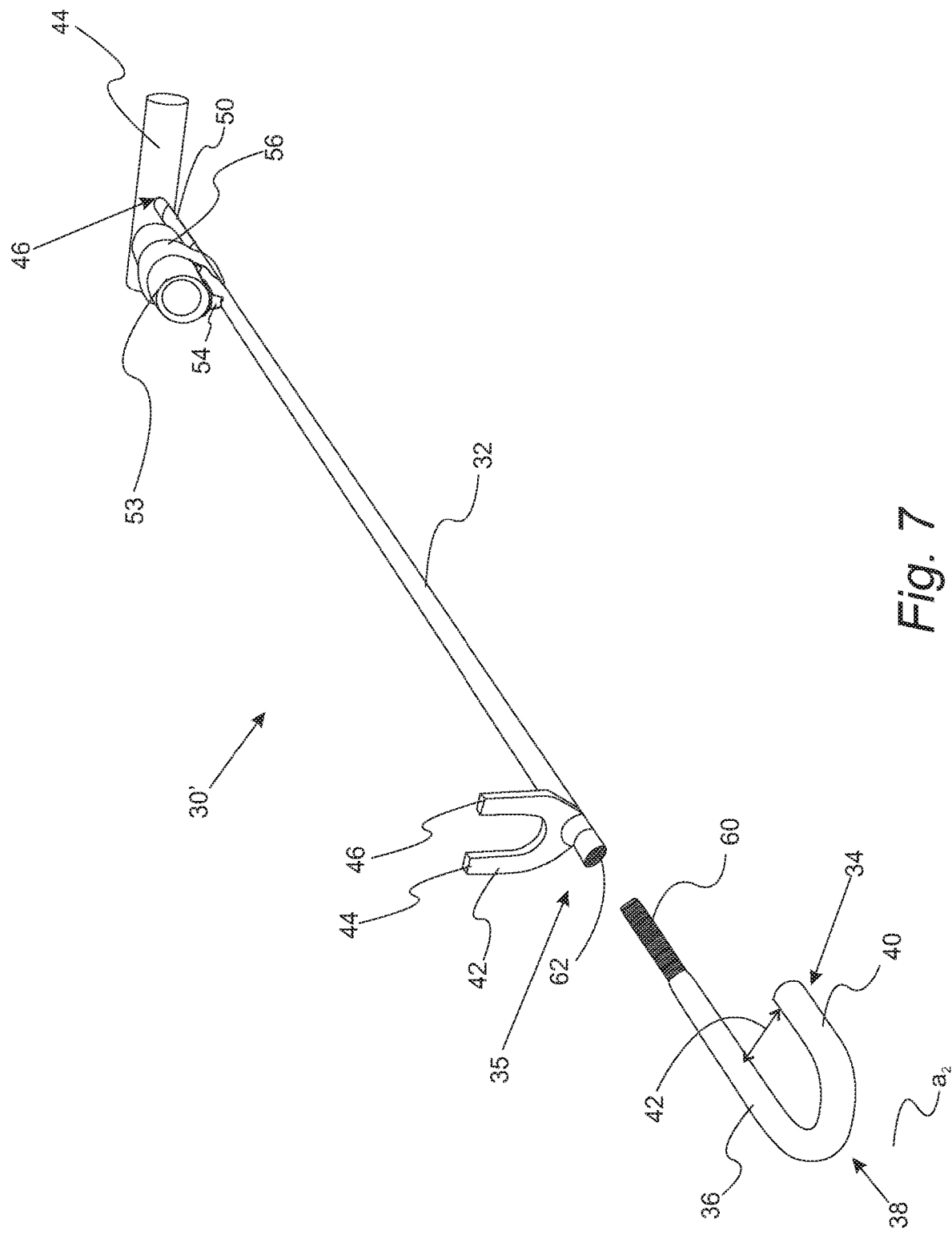
FIG. 7 is a perspective view of a combination tandem puller having an attached flashlight and a detachable hook section.

With reference to FIG. 7, a schematic perspective view of a variation of the combination tandem puller with a detachable J-hook is provided. Combination tandem puller 30' includes shaft section 32 which is detachably connected to hook section 34. In particular, hook section 34 includes threaded section 60 that is mated to threaded section 62 of shaft section 32. In one refinement, threaded section 60 is a male section and threaded section 62 is a female section. In another refinement, threaded section 60 is a female section and threaded section 62 is a male section. The additional details of combination tandem puller 30' are the same as those set forth above with respect to the description of FIGS. 4, 5, and 6.

Figure 8:
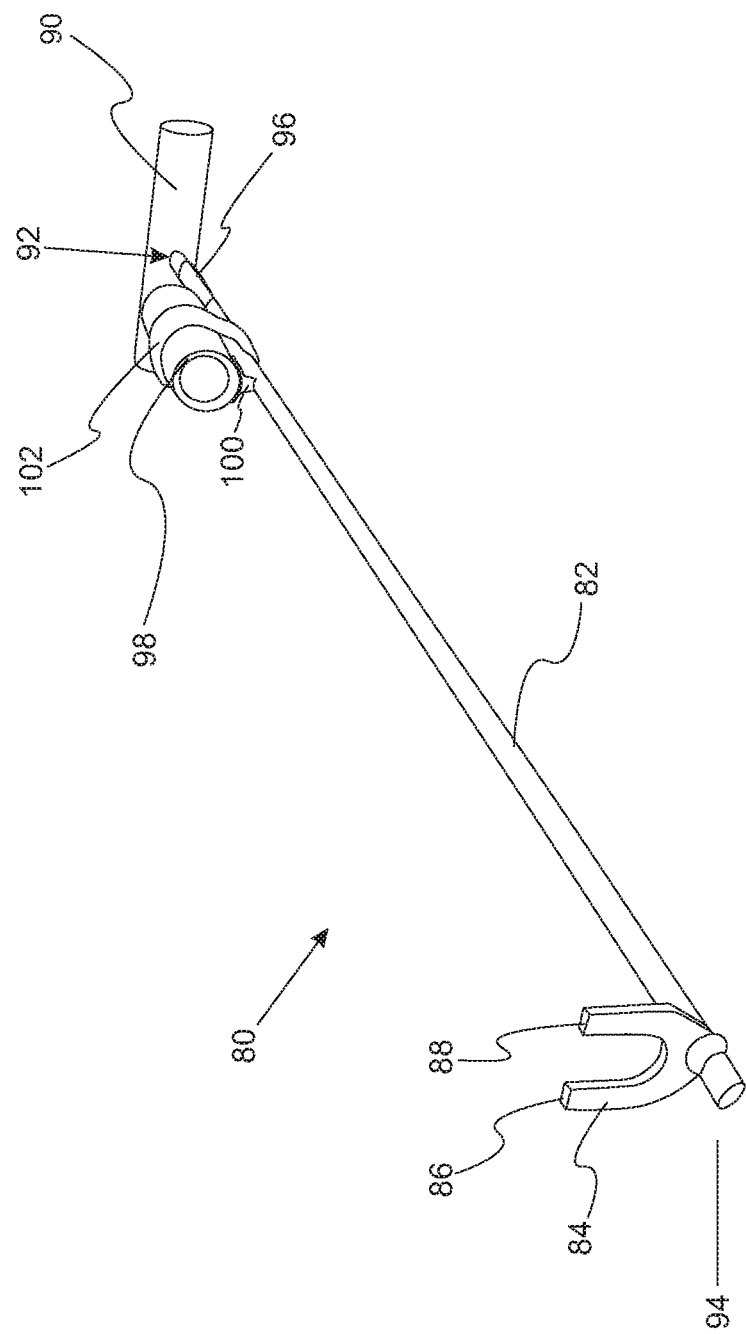
FIG. 8 is a perspective view of a tandem puller having an attached flashlight without a hook section.

With reference to FIG. 8, a schematic illustration of a tandem puller which does not include a hook section is provided. Tandem puller 80 includes shaft section 82. Shaft section 82 is typically a rod, and in particular, a metal rod. Forked tab 84 extends from shaft section 82. Forked tab 84 is a two pronged fork structure generally having a U-shape. Forked tab 84 includes prongs 86, 88 which assist in the actuation of a release button. In one variation, tandem puller 80 includes handle 90 which is attached to shaft end 92 of shaft section 82. Forked tab 84 is closer to shaft end 94 than to shaft end 92. Typically, forked tab 84 is within 1 to three inches of shaft end 94. Alternatively, in another variation, hand gripping section 96 is positioned over shaft section 82. In another variation, flashlight 98 is attached to shaft section 82 in order to provide a user with the ability to illuminate under a trailer when using tandem puller 80. In a refinement, flashlight 98 is held on holder 100 via strap 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A combination tandem puller comprising;
   a shaft section having a first end and a second end;
   a handle attached to the first end of the shaft section;
   a hook section attached to the second end of the shaft section; and
   a forked tab attached to and extending from the shaft section, wherein the hook section includes a shank section, a bend, and front section and wherein the shank section and the front section are oriented related to each other with an angle from about −30 degrees to 90 degrees.

2. The combination tandem puller of claim 1 further comprising a holder for attaching a light source to the combination tandem puller.

3. The combination tandem puller of claim 2 further comprising a light source attached to the holder.

4. The combination tandem puller of claim 1 wherein the forked tab includes two prongs that define a U-shape.

5. The combination tandem puller of claim 1 wherein the forked tab is oriented on the shaft section such that the hook section does not interfere with its operation.

6. The combination tandem puller of claim 1 wherein the hook section defines a gape from about 0.25 inches to about 5 inches.

7. The combination tandem puller of claim 1 wherein the hook section defines a gape from about 0.5 inches to about 2 inches.

8. The combination tandem puller of claim 1 wherein the angle is from about 0 degrees to 90 degrees.

9. The combination tandem puller of claim 1 wherein the shaft section and the hook section are metal.

10. The combination tandem puller of claim 1 wherein the hook section is detachable from the shaft section.

11. The combination tandem puller of claim 10 wherein the hook section includes a first threaded section and the shaft section includes a second threaded section, the first threaded section mating to the second threaded section.

12. A combination tandem puller comprising;
a shaft section having a first end and a second end;
a handle attached to the first end of the shaft section;
a hook section attached to the second end of the shaft section; and
a forked tab attached to and extending from the shaft section, the forked tab being closer to the second end than the first end, wherein the hook section includes a shank section, a bend, and front section and wherein the shank section and the front section are oriented related to each other with an angle from about 0 degrees to 90 degrees.

13. The combination tandem puller of claim 12 wherein the forked tab includes two prongs that define a U-shape.

14. The combination tandem puller of claim 12 further comprising a holder for attaching a light source to the combination tandem puller.

15. The combination tandem puller of claim 12 wherein the forked tab is oriented on the shaft section such that the hook section does not interfere with its operation.

16. The combination tandem puller of claim 12 wherein the hook section defines a gape from about 0.25 inches to about 5 inches.

17. The combination tandem puller of claim 12 wherein the hook section defines a gape from about 0.5 inches to about 2 inches.

18. The combination tandem puller of claim 12 wherein the hook section is detachable from the shaft section.

19. The combination tandem puller of claim 18 wherein the hook section includes a first threaded section and the shaft section includes a second threaded section, the first threaded section mating to the second threaded section.

* * * * *